United States Patent
Fried et al.

(10) Patent No.: US 11,725,558 B2
(45) Date of Patent: Aug. 15, 2023

(54) METHODS AND SYSTEMS FOR AFTERTREATMENT DEVICE

(71) Applicant: Ford Global Technologies, LLC, Dearborn, MI (US)

(72) Inventors: Marcus Fried, Farmington Hills, MI (US); Paul Lindsey Rounce, Basildon (GB); Owen Lineham, Grays (GB); Paul M Laing, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 214 days.

(21) Appl. No.: 17/200,615

(22) Filed: Mar. 12, 2021

(65) Prior Publication Data

US 2022/0290596 A1 Sep. 15, 2022

(51) Int. Cl.
*F01N 3/20* (2006.01)
*B60K 15/035* (2006.01)

(52) U.S. Cl.
CPC ......... *F01N 3/2033* (2013.01); *F01N 3/2013* (2013.01); *B60K 15/03519* (2013.01)

(58) Field of Classification Search
CPC ............. F01N 2240/16; F01N 2610/03; F01N 2900/0602; F01N 2900/08; F01N 3/2006; F01N 3/2013; F01N 3/2033; F01N 3/22; F01N 3/30; F01N 3/36; F01N 9/00; B60K 15/03519
See application file for complete search history.

(56) References Cited

U.S. PATENT DOCUMENTS

| | | | |
|---|---|---|---|
| 3,768,982 A | 10/1973 | Kitzner | |
| 4,033,133 A | 7/1977 | Houseman et al. | |
| 6,463,889 B2 * | 10/2002 | Reddy | F02M 33/02 123/3 |
| 6,910,467 B2 * | 6/2005 | Murakami | F02M 25/08 123/383 |
| 8,943,804 B2 | 2/2015 | Schreurs | |
| 10,400,692 B2 | 9/2019 | Hofstaetter et al. | |
| 11,261,770 B1 * | 3/2022 | Delleree | F01N 3/2013 |

FOREIGN PATENT DOCUMENTS

EP 1927579 A1 6/2008

* cited by examiner

*Primary Examiner* — Anthony Ayala Delgado
(74) *Attorney, Agent, or Firm* — Vincent Mastrogiacomo; McCoy Russell LLP (57) ABSTRACT

Methods and systems are provided for an exhaust system. In one example, a method includes heating an aftertreatment device during an engine off. The heating includes utilizing one or more of an injector, a heater, and a recirculation fan.

19 Claims, 7 Drawing Sheets

METHODS AND SYSTEMS FOR AFTERTREATMENT DEVICE

FIELD

The present description relates generally maintaining the temperature of an aftertreatment device.

BACKGROUND/SUMMARY

Reduction of tailpipe emissions may be a shared goal among manufacturers in the automotive industry. As the standards for emissions continue to increase, technologies may continually evolve to meet the standards. Tailpipe emissions based on current standards may need to be reduced to meet future regulations. Previous approaches to reducing cold-start emissions include developing catalysts that can warm up quickly and light-off at lower temperatures and optimizing engine cold start conditions to deliver heat to the catalyst as quickly as possible. However, even with fast catalyst light-off, there is still a duration of time during a cold start when the catalyst is not warm enough to convert emissions species.

Some approaches utilize electric heaters to directly heat the catalyst. However, these approaches may demand additional energy storage devices arranged on-board a vehicle. Heating an entire catalyst or a portion thereof via only the electric heater may be inefficient. Additionally, these systems may be left open during operation of the electric heater. Thermal communication between the ambient atmosphere and the catalyst may occur via ambient air entering the exhaust passage through a tailpipe end or an engine end which may result in thermal losses. Thus, an approach to reducing cold-start emissions is still desired.

In one example, the issues described above may be addressed by a method for heating an aftertreatment device during an engine off to maintain a temperature of the aftertreatment device above a threshold temperature. In this way, the aftertreatment device may be configured to treat emissions during a subsequent engine start.

As one example, an exhaust gas system includes an injector positioned to inject directly into an exhaust passage. The exhaust gas system may further include an electric heater and a fan. The electric heater and injector may be used to heat the aftertreatment device, wherein the fan is activated during the heating to recirculate hot gases within the exhaust gas system to more efficiently heat the entire aftertreatment device. Valves may be arranged upstream and downstream of the aftertreatment device to create a closed system, such that gases from an engine side or a tailpipe side may not enter the exhaust gas system. A double wall insulation may be further arranged around the exhaust gas system, which, in combination with the valves, may form a closed, insulated system configured to efficiently retain heat generated by the electric heater and injector.

It should be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
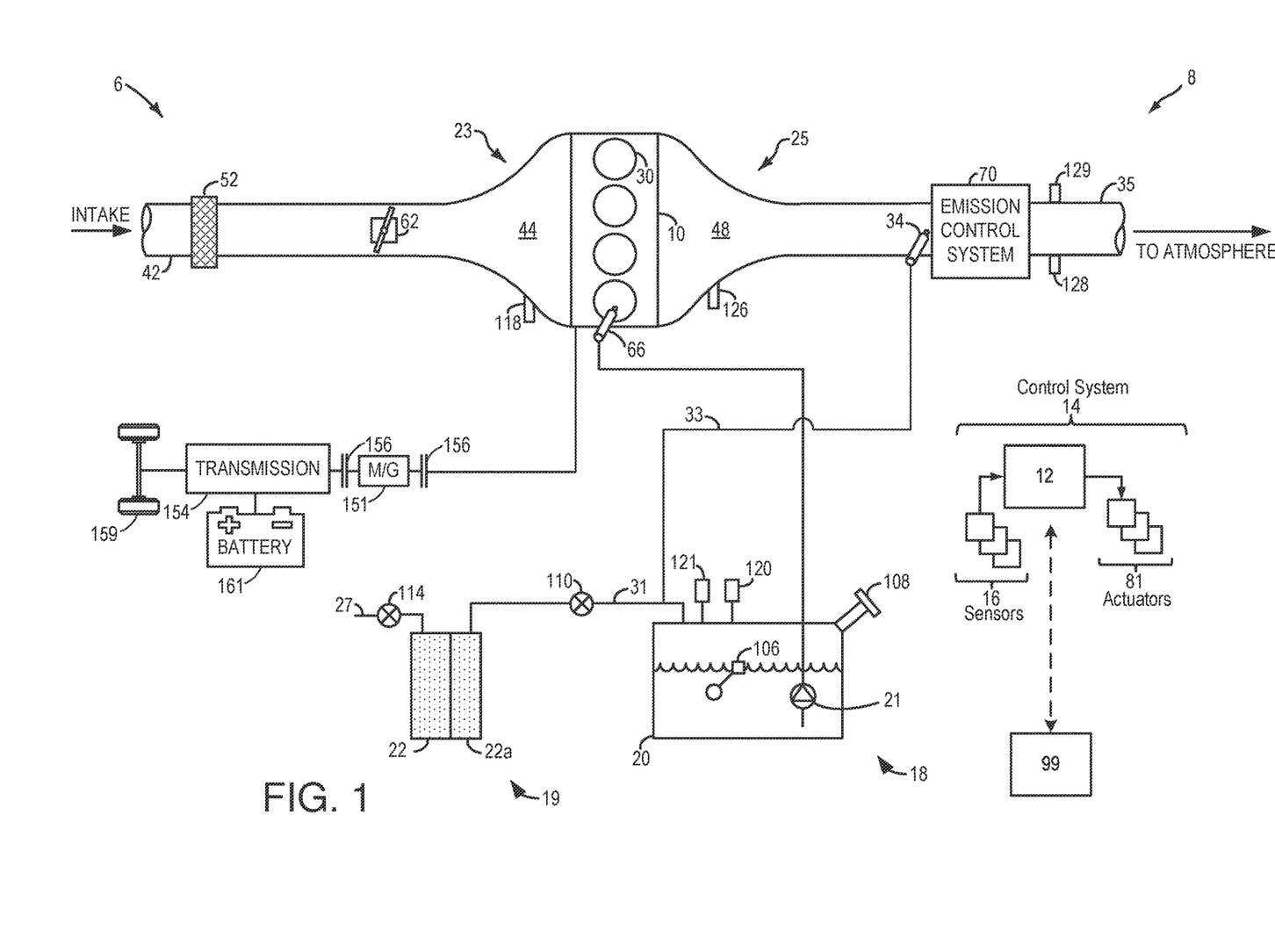
FIG. 1 illustrates a schematic of an engine included in a hybrid vehicle.
Figure 2:
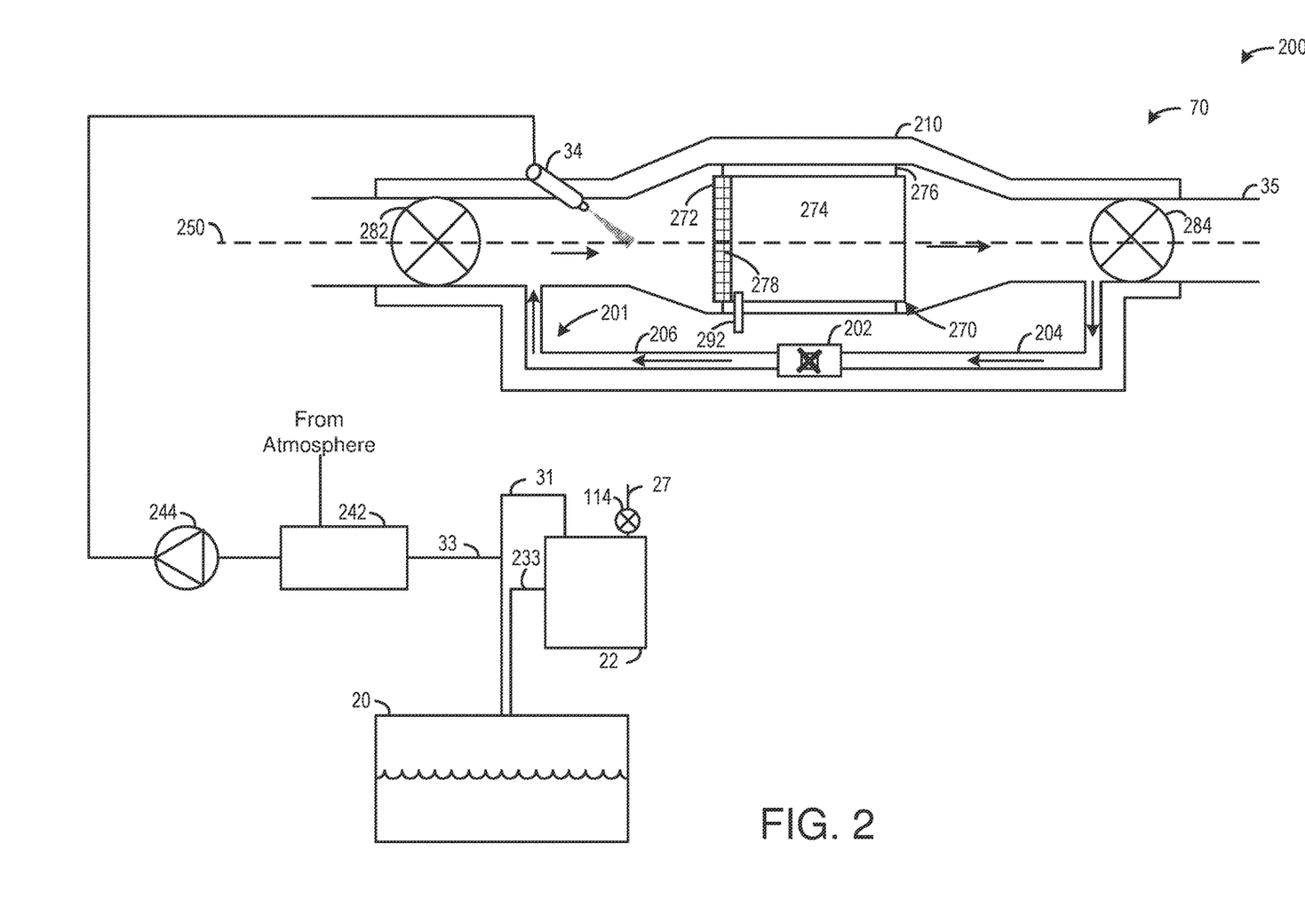
FIG. 2 illustrates a schematic for an emission control system of the hybrid vehicle.

The following description relates to systems and methods for maintaining an aftertreatment device temperature during an engine off. The engine may be an engine of a hybrid vehicle, as shown in FIG. 1. The aftertreatment device may be included in an emission control system. The emission control system may include a variety of features for maintaining a temperature of the aftertreatment device during the engine off. FIG. 2 illustrates the emission control system including an injector, an electric heater, a fan, valves, and insulating material for maintaining a temperature of the aftertreatment device at a threshold temperature.

Figure 3:
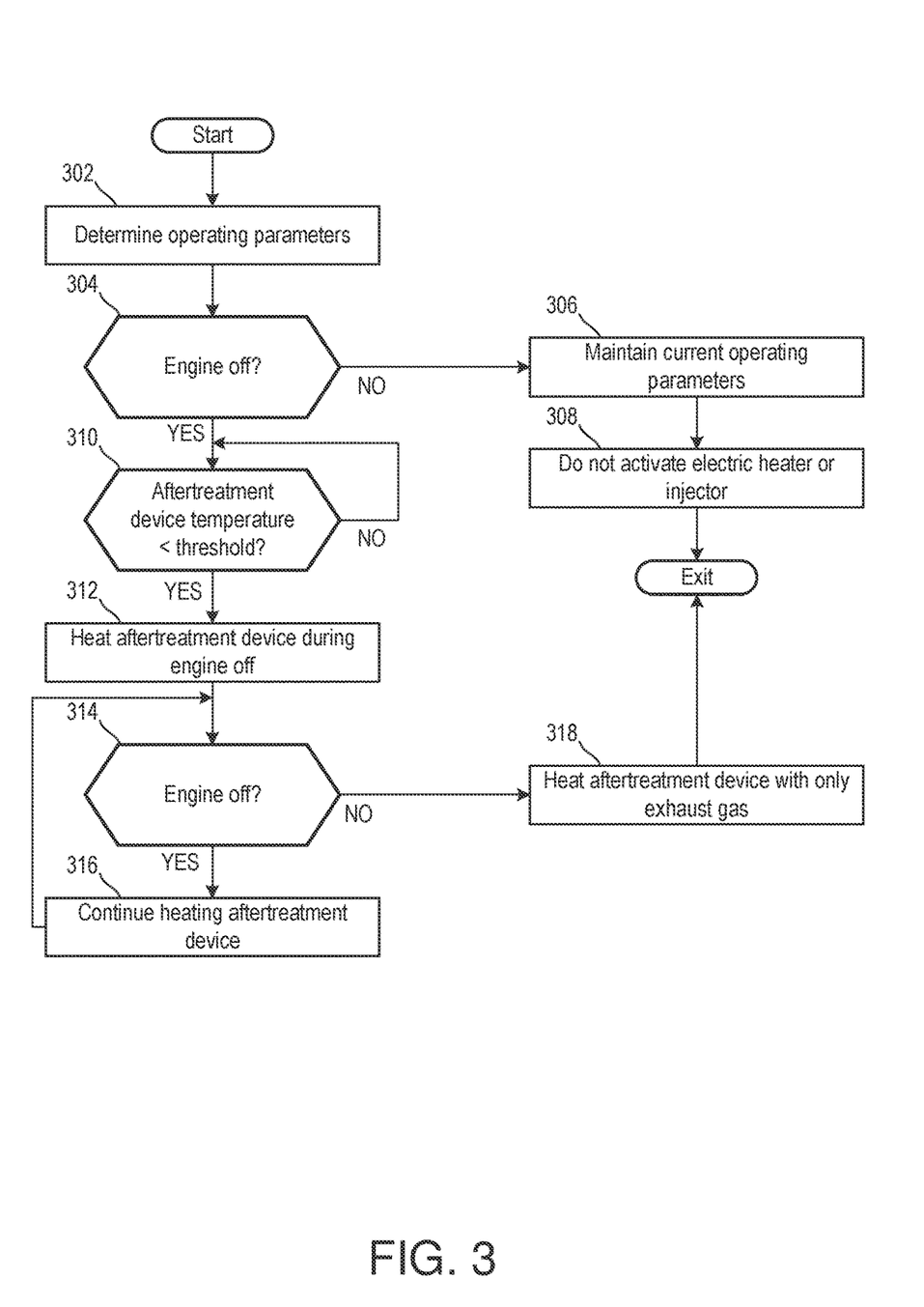
FIG. 3 illustrates a method for maintaining an aftertreatment device temperature during an engine off.
Figure 4A:
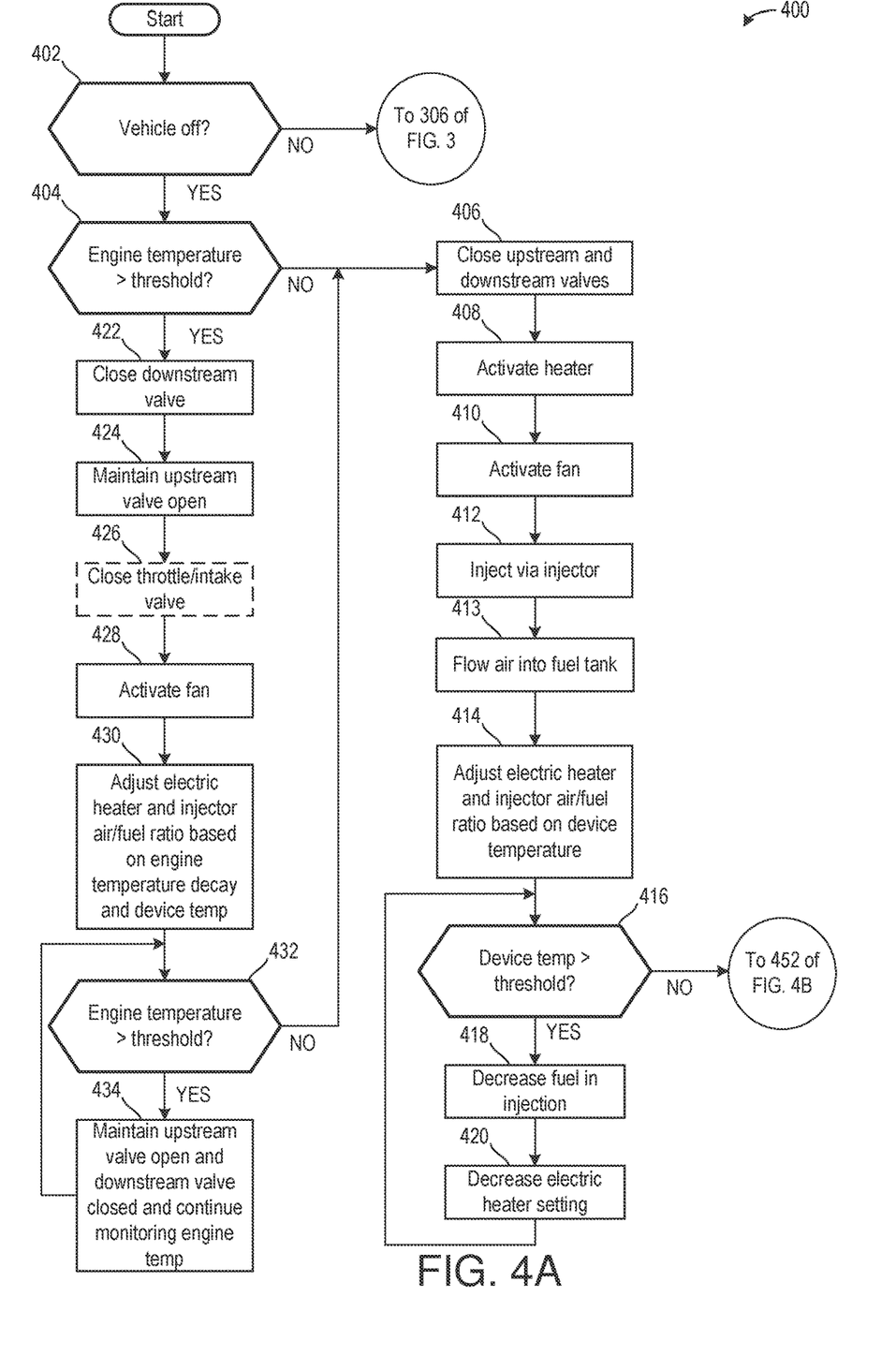
FIGS. 4A and 4B illustrate a method for adjusting operating parameters of an injector and an electric heater based on an aftertreatment device temperature during the engine off.
Figure 4B:
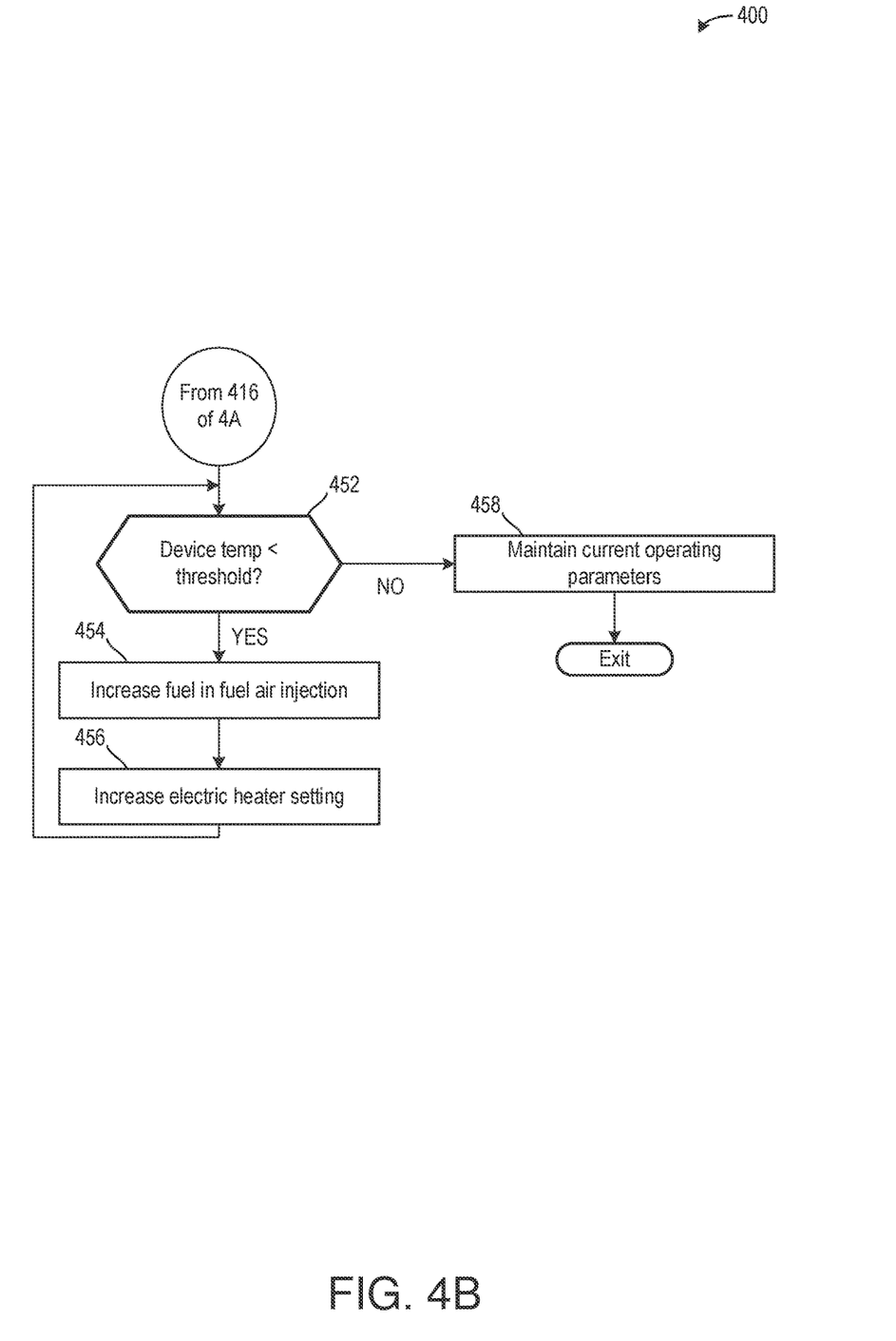
Figure 5:
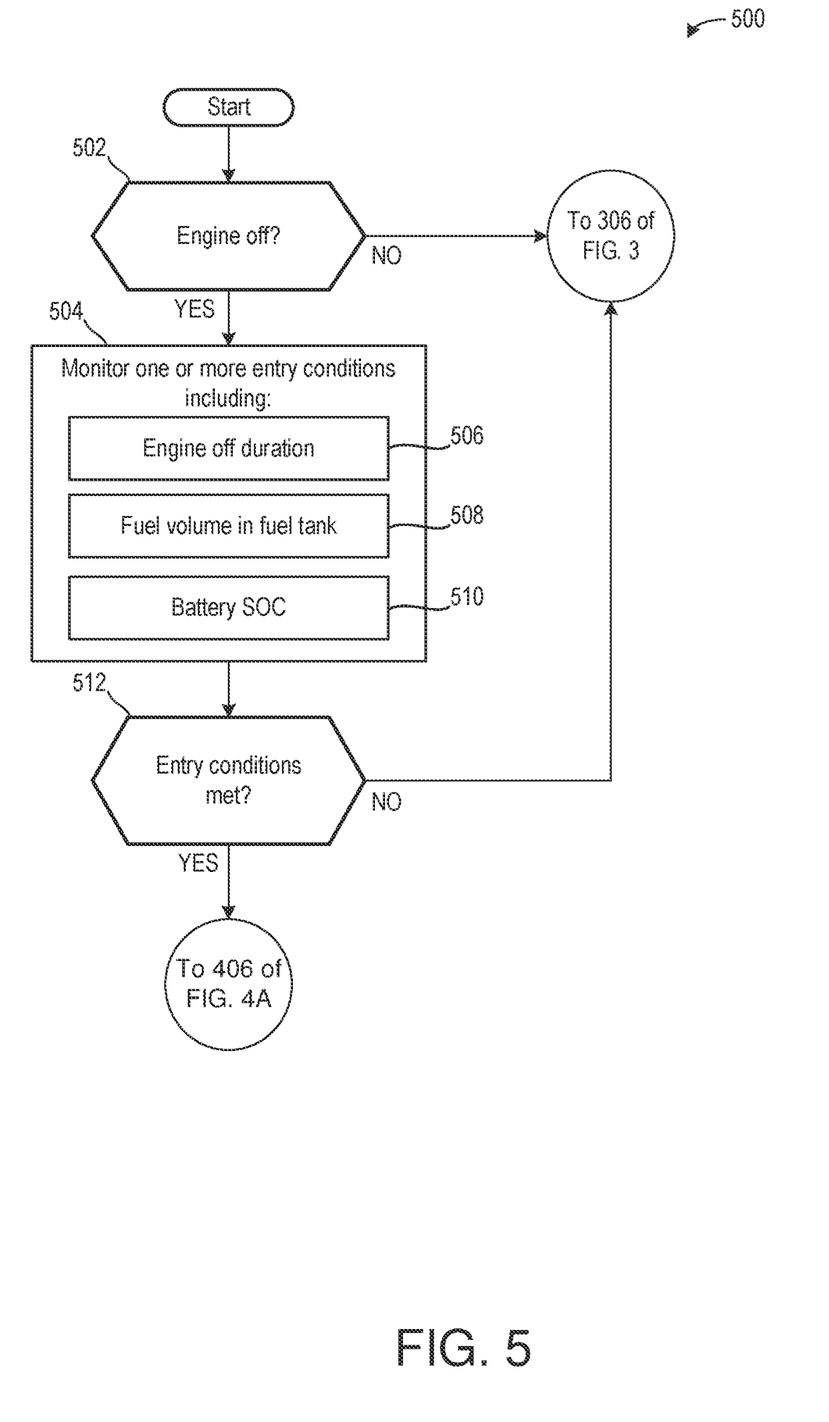
FIG. 5 illustrates a method for determining if conditions are met for heating the aftertreatment device during the engine off.
Figure 6:
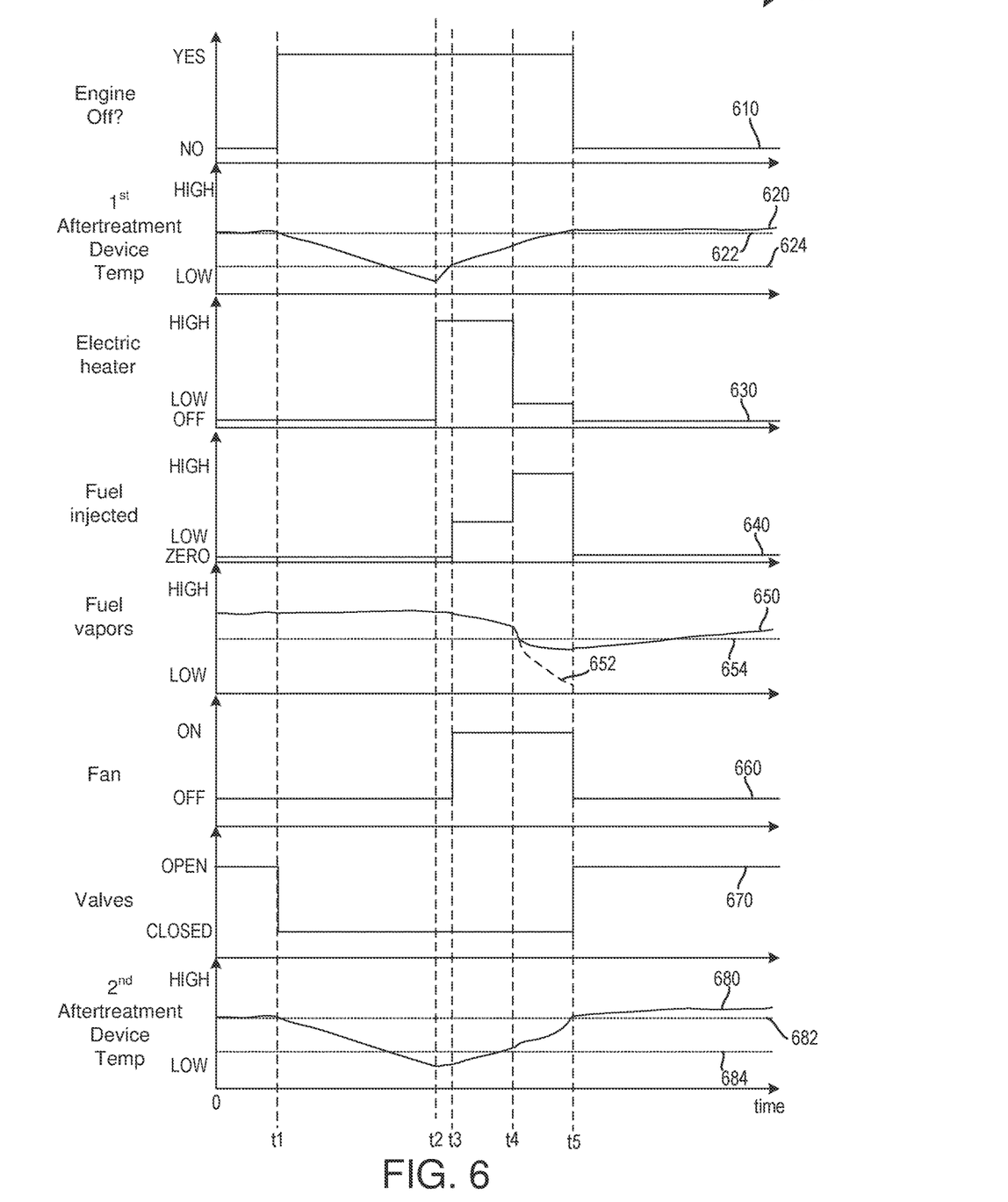
FIG. 6 illustrates an engine operating sequence for maintaining the aftertreatment device temperature during the engine off.

A high-level flow chart for operating the emission control system is illustrated in FIG. 3. A method for maintaining the aftertreatment device temperature following an engine off is shown in FIGS. 4A-4B. A method for monitoring entry conditions for maintaining the aftertreatment device temperature during an engine off is shown in FIG. 5. A graphical display of a prophetic engine operating sequence is illustrated in FIG. 6.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18, and evaporative emissions system 19. Fuel system 18 includes a fuel tank 20 coupled to a fuel pump 21, the fuel tank supplying fuel to an engine 10 which propels a vehicle. Evaporative emissions system 19 includes fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23. While a single canister 22 is shown, it will be appreciated that fuel system 18 may include any number of canisters.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23. While this example shows vent 27 communicating with fresh, unheated air, various modifications may also be used. Vent 27 may include a canister vent valve (CVV) 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be in an open position that is closed upon actuation of the canister vent solenoid.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to adjust the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank), the refueling vapors may be released into the canister and the fuel tank pressure may be maintained below pressure thresholds. While the depicted example shows isolation valve 110 positioned along conduit 31, in alternate embodiments, the isolation valve may be mounted on fuel tank 20.

An injector line 33 may branch from the conduit at a region between the isolation valve 110 and the fuel tank 20.

The injector line 33 may be configured to deliver fuel vapors from the fuel tank 20 to an injector 34. Additionally or alternatively, the injector line 33 may be configured to draw fuel vapors from the canister 22 in other arrangements of the system. In some examples, additionally or alternatively, the injector line 33 may deliver liquid fuel directly from the fuel tank 20.

The injector 34 may be positioned to inject fuel directly into the exhaust passage 35. The injector may inject in response to one or more conditions including a temperature of an aftertreatment device arranged in the emission control system 70 being less than a threshold temperature. The injector 34 may inject in a direction toward an upstream face of the aftertreatment device relative to a direction of gas flow. The injector 34 and a method of heating the aftertreatment device are described in greater detail below.

One or more pressure sensors 120 may be coupled to fuel system 18 for providing an estimate of a fuel system (and evaporative emissions system) pressure. In one example, the fuel system pressure, and in some example evaporative emissions system pressure as well, is indicated by pressure sensor 120, where pressure sensor 120 is a fuel tank pressure transducer (FTPT) coupled to fuel tank 20. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate undesired evaporative emissions based on changes in a fuel tank (and evaporative emissions system) pressure during an evaporative emissions diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel system 18 and evaporative emissions system 19 may be operated by controller 12 in a plurality of modes by selective adjustment of the various valves and solenoids. For example, the fuel system and evaporative emissions system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system and evaporative emissions system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before enabling fuel to be added therein. As such, isolation valve 110 may be kept open during the refueling operation to allow refueling vapors to be stored in the canister. After refueling is completed, the isolation valve may be closed.

As yet another example, the fuel system and evaporative emissions system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

While the above descriptions depict examples where a fuel tank isolation valve is included in the vehicle system, in other examples a fuel tank isolation valve may not be included without departing from the scope of this disclosure.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory. For example, control system 14 may be communicatively coupled to an off-board computing system 99 such as a network or cloud computing system via wireless communication, which may be Wi-Fi, Bluetooth, a type of cellular service, or a wireless data transfer protocol. As such, this connectivity where the vehicle data is uploaded, also referred to as the "cloud", may be a commercial server or a private server where the data is stored and then acted upon by optimization algorithms. The algorithm may process data from a single vehicle, a fleet of vehicles, a family of engines, a family of powertrains, or a combination thereof. The algorithms may further take into account the system limitations, produce calibration data for optimizing powertrain outputs, and send them back to the vehicle(s) where they are applied. Off-board computing system 99 may store or provide access to data that may be downloaded to control system 14 for processing by controller 12.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 159. In other examples, vehicle 6 is a conventional vehicle with only an engine, or an electric vehicle with only electric machine(s). In the example shown, vehicle 6 includes engine 10 and an electric machine 151. Electric machine 151 may be a motor or a motor/generator. A crankshaft of engine 10 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 12 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

FIG. 2 illustrates an embodiment 200 of the emission control system 70. As such, components previously introduced may be similarly numbered in this figure. The embodiment 200 illustrates various features of the emission control system used to maintain a temperature of the emission control system 70 during an engine off or a vehicle off.

Emission control system 70 may be configured to treat combustion emissions. The embodiment 200 of the emission control system 70 may include components that regulate the heat of the system to promote thermal efficiency. The emission control system 70 may include an aftertreatment device 270 including a first aftertreatment device 272 and a second aftertreatment device 274. The first aftertreatment device 272 and the second aftertreatment device 274 may be identical in catalytic composition. Additionally or alternatively, the first aftertreatment device 272 and the second aftertreatment device 274 may comprise different catalytic compositions for treating a range of emission products. For example, the first aftertreatment device 272 may be configured for oxidation and the second aftertreatment device 274 may be configured for reduction. Additionally or alternatively, the first aftertreatment device 272 and the second aftertreatment device 274 may be one or more of a particulate filter, oxidation catalyst, $NO_x$ trap, selective catalytic reduction (SCR) device, three-way catalyst (TWC) and the like.

The first aftertreatment device 272 may be arranged upstream of the second aftertreatment device 274 relative to a direction of gas flow in the exhaust passage 35. In the example of FIG. 2, the first aftertreatment device 272 and the second aftertreatment device 274 are in face-sharing contact, wherein a downstream face of the first aftertreatment device 272 is in face-sharing contact with an upstream face of the second aftertreatment device 274. In some examples, additionally or alternatively, a gap may be arranged between the first aftertreatment device 272 and the second aftertreatment device 274. The gap may be an air gap, in one example. Additionally or alternatively, the gap may include a barrier, such as a heat shield (e.g., a ceramic material) or the like. In one example, if a heat shield is arranged between the first aftertreatment device 272 and the second aftertreatment device 274, then the heat shield may include perforations or other features to allow exhaust flow therethrough with minimal exhaust backpressure generated.

The first aftertreatment device 272 may be smaller than the second aftertreatment device 274. In one example, a width of the first aftertreatment device 272, measured in the direction of gas flow through the exhaust passage 35, is smaller than a width of the second aftertreatment device 274. The width of the first aftertreatment device 272 may be equal to less than 70%, or less than 50%, or less than 30%, or less than 20% of the width of the second aftertreatment device 274. By doing this, the first aftertreatment device 272 may be lit-off more quickly relative to the second aftertreatment device 274.

The first aftertreatment device 272 may comprise an electric heater 278 integrally arranged therein. The electric heater 278 may include a plurality of heating elements winding through a substrate of the first aftertreatment device 272. An actuator electrically coupled to a controller (e.g., controller 12 of FIG. 1) may activate the electric heater 278 during some operating conditions. The electric heater 278 may be configured to heat the first aftertreatment device 272 in combination with or independent of engine exhaust gas by receiving power from a battery or other energy storage device.

In one example, the aftertreatment device 270 may include a ceramic material configured to enhance its thermal retention. The ceramic material may be arranged on one or more of the first aftertreatment device 272 and the second aftertreatment device 274. The ceramic material may be configured to function as a heat shield, wherein the ceramic material is positioned to block heat from flowing from the aftertreatment device 270 to other portions of the emission control system 70.

The first aftertreatment device 272 may be further differentiated from the second aftertreatment device 274 via a thermally shielding material coated thereon. The thermally shielding material may be arranged on the upstream face of the first aftertreatment device 272. In one example, the coating may comprise ceramics that coat the surface area of the upstream face of the first aftertreatment device 272. In this way, the thermally shielding material and the second aftertreatment device 274 may form radiant heat shields insulating upstream and downstream faces of the first aftertreatment device 272. In this way, once the first aftertreatment device 272 is lit-off, thermal retention may be enhanced, thereby increasing efficiency. In some examples, the first aftertreatment device 272 and the corresponding electric heater 278 may be omitted such that only the second aftertreatment device 274 is the only aftertreatment device of the emission control system 70. In some examples, additionally or alternatively, the electric heater may be integrally arranged into the single device.

An upstream exhaust valve 282 and a downstream exhaust valve 284 may sandwich the aftertreatment device 270. The upstream exhaust valve 282 is positioned between the engine and aftertreatment device 270 along the exhaust passage 35. The downstream exhaust valve 284 may be positioned between aftertreatment device 270 and a tailpipe. Upstream exhaust valve 282 and downstream exhaust valve 284 may be configured to adjust gas flow through the emission control system 70. Upstream exhaust valve 282 and downstream exhaust valve 284 may be configured to actuate to a fully open position, a fully closed position, or any position therebetween in response to a signal provided from the controller to respective actuators of the upstream and downstream exhaust valves 282, 284. Upstream exhaust valve 282 and downstream exhaust valve 284 may include a reduced packaging size compared to other valves to maximize thermal efficiency. In one example, upstream exhaust valve 282 and downstream exhaust valve 284 may be open, and the exhaust gases passing through emission control system 70 may flow in a general direction parallel to central axis 250. In one example, the vehicle may be off, and the aftertreatment device temperature may be lower than a threshold temperature, which may be a light-off temperature. In this case, upstream exhaust valve 282 and downstream exhaust valve 284 may close to block ambient air flow from a tailpipe side or an engine side to the emission control system 70. The emission control system 70 may receive injections of a combination of fuel vapor and air or only liquid fuel from injector 34. Injector 34 may introduce fuel to emission control system 70 using vapors from fuel tank 20 or canister 22. Additionally or alternatively, the injector 34 may be configured to inject only liquid fuel or air, wherein liquid fuel is gather from the fuel tank 20. Fuel vapors may flow through injector line 33 (which may also be referred to as conduit 33, herein), from the fuel tank and/or the canister 22, and into an air mixing valve 242 before being injected into the aftertreatment system. Fuel vapors in air mixing valve 242 may be mixed with air drawn in from atmosphere, and this mixture may continue flowing through conduit 33. From a controller-based command, a metered pump 244 may pump the air/fuel mixture (or only fuel or only air) through conduit 33 to injector 34. An actuator of the injector 34 may receive a signal (e.g., a pulse-width) from a controller in proportion to a desired air/fuel mixture injection or liquid fuel injection or air injection based on one or more of a temperature of the first aftertreatment device 272 and/or the second aftertreatment device 274. In one example, an air/fuel ratio of the emission control system 70 is set via the injection of fuel, air, or a mixture thereof, wherein the air/fuel ratio is adjusted in response to the temperatures of the first and second aftertreatment devices. In one example, air may be drawn into fuel tank 20 from evaporative canister 22 via conduit 33 to replace lost vapors during an injection. Evaporative canister 22 may be filled with an adsorbent for trapping fuel vapors (including vaporized hydrocarbons) generated during fuel tank refueling operations, as well as diurnal vapors. Evaporative canister 22 may include a vent 27 for routing gases out of the evaporative canister 22 to the atmosphere when storing, or trapping, fuel vapors from fuel tank 20. Vent 27 may also allow fresh air to be drawn into evaporative canister 22 when purging stored fuel vapors during some conditions, such as when aftertreatment device temperature maintenance is occurring. In such an example, CVV 114 may be opened in response to a fuel vapor load being less than a threshold load, wherein ambient air may be such through the vent line 27 and into the canister 22. The fuel tank 20 may draw the air from the canister 22 which may generate more fuel vapors in the fuel tank 20.

The orientation of injector 34 relative to central axis 250 may be angled relative to central axis 250. Injector 34 may be oriented toward the upstream face of the first aftertreatment device. In one example, the injector 34 is positioned to inject directly into the exhaust passage 35 at an area adjacent to an intersection between the central axis 250 and the upstream face of the first aftertreatment device 272.

In one example, a distance between the injector 34 and the first aftertreatment device 272 may be adjusted based on mixing characteristics between the injection and gas flow through the exhaust passage 35 provided via a fan 202. In one example, the injector 34 may be positioned near an intersection between an outlet passage 206 of a recirculation passage 201 and the exhaust passage 35. More specifically, the injector 34 may be arranged between the intersection and the first aftertreatment device 272, thereby allowing the gas flow generated by the fan 202 to expand within the exhaust passage 35 before mixing with the injection. Additionally or alternatively, the injector may be arranged between the upstream valve 282 and the intersection.

The fan 202 may be arranged within the recirculation passage 201. The recirculation passage 201 may be a secondary passage branching from the exhaust passage 35 at two intersections, one between of the aftertreatment device 270 and the upstream valve 282 and another between the aftertreatment device 270 and the downstream valve 284. An inlet passage 204 may extend from between the aftertreatment device 270 and the downstream valve 284 and the outlet passage may extend from the aftertreatment device 270 and the upstream valve 282. The recirculation passage 201 may comprise a U-shape, wherein the recirculation passage is spaced away from the exhaust passage 35 at areas away from the intersections therebetween. Thus, inlet passage 204 may have an L shape, and outlet passage 206 may have an L shape. Fan 202, which may be arranged at an intersection between the inlet passage 204 and the outlet passage 206, may be configured to direct the input flow of air and fuel passing through aftertreatment device 270 to flow through inlet passage 204 and outlet passage 206 to output between upstream exhaust valve 282 and aftertreatment device 270.

The first aftertreatment device 272 and the second aftertreatment device 274 may be arranged within a common housing 276. The common housing 276 may be arranged between the first and second aftertreatment devices 272, 274 and internal surfaces of the exhaust passage 35. In one example, the emission control system 70 may be enclosed by an insulating layer 210 to reduce heat loss and reduce the amount of fuel needed to maintain the temperature of aftertreatment device 270 while the engine or vehicle is off. Internal surfaces of the exhaust passage 35 extending from an upstream exhaust valve 282 and a downstream exhaust valve 284 and facing an interior volume of an exhaust pipe of the exhaust passage 35, may comprise stainless steel. In one example, the stainless steel is an austenitic alloy, configured to reduce a hardening of the pipe in response to elevated temperatures. A thickness of the stainless steel may vary between 0.5 and 1.5 mm. Additionally or alternatively, the austenitic alloy may not be arranged through the entire length of the exhaust passage from the upstream exhaust valve 282 and the downstream exhaust valve 284. In one example, the austenitic alloy may span from only the upstream face of the first aftertreatment device 272 to the downstream exhaust valve 284.

The insulating layer 210 may further comprise a double walled layer of insulation with a gap between an inner wall and an outer wall. In one example, the inner wall may comprise stainless as described above, while the outer wall may comprise a different material or the same material. The gap between the inner wall and the outer wall may be filled with a gas, a liquid, a foam, a vacuum, or other insulating material. The inner wall may extend from the upstream valve 282 to the downstream valve 284, wherein the inner wall and the outer wall may surround an entirety of the emission control system 70, including the recirculation passage 201 and the exhaust passage 35. The insulating layer 210 may thereby reduce thermal communication between an ambient atmosphere and the valves, the fan 202, and the aftertreatment device 270.

In one example, the insulating layer 210 may surround the emission control system 70 extending from the upstream valve 282 to the downstream valve 284. The insulating layer 210 may be further shaped to surround the recirculation passage 201 such that thermal communication between the upstream and downstream valves, the fan, and the aftertreatment device with an ambient atmosphere is reduced. In one example, upstream exhaust valve 282, downstream exhaust valve 284, injector 34, inlet passage 204, and outlet passage 206 may be positioned closer to aftertreatment device 270 to reduce the amount of insulation needed in the production of insulation layer 210, lowering manufacturing costs and a packaging size of the emission control system 70.

A sensor 292 may be arranged within the second aftertreatment device 274 to measure a temperature of the first aftertreatment device. The sensor 292 may be arranged to an interface between the first aftertreatment device 272 and the second aftertreatment device 274. In one example, sensor 292 is a temperature sensor that sends feedback to a controller (e.g., controller 12 of FIG. 1). In another example, sensor 292 may be omitted, wherein conditions of the aftertreatment device 270 may be determined via feedback from a universal exhaust gas oxygen (UEGO) sensor (e.g., exhaust gas sensor 126 of FIG. 1). Data from the UEGO may be stored in a multi-input look-up table, wherein during engine off or vehicle off conditions, the controller may look-up various values based one or more inputs including an electric heater setting, an amount of fuel injected, an amount of air injected, an ambient temperature, and the like. Sensor 292 may be positioned adjacent to the downstream face of the first aftertreatment device 272. In one example, sensor 292 senses exhaust flowing through the second aftertreatment device 274 after flowing through the first aftertreatment device 272 and provides feedback to the controller. The controller may then adjust one or more heating parameters in response to the sensor feedback or output gather from the multi-input look-up table.

In one example, the sensor 292 may be a catalyst oxygen sensor configured to fine tune an exhaust lambda during engine on conditions. The sensor 292 may be further configured as a temperature sensor and an oxygen sensor to provide feedback regarding an exhaust lambda in the emission control system 70 to control heat to the catalyst, sense equivalence in the catalyst heating exhaust mixture, and to monitor the operation of the heating system as an emissions control device.

In the example of FIG. 2, the emission control system 70 may be illustrated in a heating operation. As such, the injector 34 is injected, the fan 202 is active, and the electric heater 278 is on. During the heating operation, the upstream valve 282 and the downstream valve 284 may be in a fully closed position such that gases within the emission control system 70 are blocked from leaving. Thus, the fan 202 may maintain air flow through the emission control system. The fan 202 may direct gases in a first direction parallel to the central axis 250 and toward the upstream valve 282 in the outlet passage 206. The gases may turn within the outlet passage 206 and begin flowing in a second direction, normal to each of the first direction and the central axis 250 as the gases enter the exhaust passage 35 at an area between the upstream valve 282 and the aftertreatment device 270. The gases may begin to flow in a third direction and mix with the fuel injection, wherein the third direction is parallel to the central axis 250 and opposite the first direction. The gases may pass through the aftertreatment device 270, thereby distributing heat generated by a combination of the electric heater and combustion of the injection. The gases may flow to the inlet passage 204 after exiting the aftertreatment device 270, wherein the gases flow in a fourth direction normal to the central axis 250 and opposite the second direction. In the inlet passage 204, the gases may turn and flow in the first direction toward the fan 202 and flow back to the exhaust passage 35 as described above.

In one example, the configuration illustrated in FIG. 2 provides an emission control system configured to efficiently heat an aftertreatment device during vehicle off conditions while minimizing fuel consumption. In a real-world example, if a cooling rate of the emission control system 70 is approximately 33 watts, then fuel consumption may be equivalent to approximately 0.092 L/Day. In such an example, it would take over 400 days to empty a 40 L fuel tank. Thus, the system of FIG. 2 may efficiently heat the catalyst with reduced energy expenditure relative to other methods of reducing cold-start emissions or a cold-start duration.

Turning now to FIG. 3, it shows a high-level flow chart illustrating a method 300 for maintaining a catalyst temperature following an engine off event. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302, which includes determining current operating parameters. Current operating parameters may include but are not limited to one or more of a throttle position, a manifold vacuum, an engine speed, an engine temperature, a vehicle speed, and an air/fuel ratio.

The method 300 may proceed to 304, which includes determining if an engine is off. It may be determined that the engine is off in response to the engine not receiving fuel. The engine may be off during one or more of a coasting event, a start/stop, a vehicle off event, an all-electric mode, or the like. In some examples, the method 300 may further include determining if the vehicle is off at 304, wherein the vehicle is off when the engine and the electric motor are deactivated.

If the engine is not off, then the method 300 may proceed to 306, which includes maintaining a current operating parameter.

The method 300 may proceed to 308, which includes not activating an electric heater or an injector. As such, an emission control system temperature may not be maintained via the electric heater or the injector.

Returning to 304, if the engine and/or vehicle is off, then the method 300 may proceed to 310, which includes determining if an aftertreatment device temperature is less than a threshold temperature. In one example, the threshold temperature is a light-off temperature. In another example, the threshold temperature is based on a temperature of the aftertreatment device where it reaches the light-off temperature within a threshold time period upon a subsequent engine start. The threshold time period may be a minute or less.

If the aftertreatment device temperature is not less than the threshold temperature (e.g., greater than or equal to the threshold temperature), then the method 300 may proceed to continue to monitor the aftertreatment device temperature during the engine and/or vehicle off.

If the aftertreatment device temperature is less than the threshold temperature, then the method 300 may proceed to 312, which includes heating the aftertreatment device. The aftertreatment device may be heated via a combination of one or more of an electric heater, a fan, and an injector. A method for heating the aftertreatment device based on a temperature thereof is illustrated with respect to FIGS. 4A and 4B.

The method 300 may proceed to 314, which includes determining if the engine is still off. If the engine is still off, then the method 300 may proceed to 316, which includes continuing to heat the aftertreatment device via one or more of the electric heater, the fan, and the fuel injector. If the engine is on, then the method 300 may proceed to 318, which includes heating the aftertreatment device with only exhaust gas. As such, the electric heater, the fan, and the injector may be deactivated. Furthermore, emissions during a cold-start of the engine may be mitigated as the aftertreatment device is lit-off at a start of the engine on. In this way, the aftertreatment device is configured to treat emissions at a beginning of the engine on without receiving thermal energy from exhaust gas.

Turning now to FIG. 4A, it shows a method 400 illustrating heating the aftertreatment device in response to conditions during an engine and/or a vehicle off. The method 400 may be executed in combination with the systems illustrated in FIGS. 1 and 2 in some examples.

The method 400 begins at 402, which includes determining if the vehicle is off as described above.

If the vehicle is not off, then the method 400 may proceed to 306 of FIG. 3, which includes maintaining a current operating parameter.

If the vehicle is off, then the method 400 may proceed to 404, which includes determining if the engine temperature is greater than a threshold temperature. In one example, the threshold engine temperature is based on one or more of an ambient temperature and a current aftertreatment device temperature.

If the engine temperature is not greater than the threshold temperature (e.g., less than or equal to the threshold temperature), then the method 400 may proceed to 406, which includes closing the upstream and downstream valves. Said another way, the upstream valve may block gases from entering the emission control system from an engine side and the downstream valve may block gases from entering the emission control system a tailpipe side when in a fully closed position.

The method 400 may proceed to 408, which includes activating the electric heater. The electric heater may receive instructions from a controller to activate one or more heating elements thereof.

The method 400 may proceed to 410, which includes activating the fan. A rotating speed of the fan may be based on one or more of the temperature of the aftertreatment device, an injection amount, and the amount of exhaust in the emission control system. The fan may circulate flow from an inlet passage positioned between the aftertreatment device and the downstream exhaust valve through an outlet passage located between the upstream exhaust valve and the aftertreatment device.

The method 400 may proceed to 412, which includes injecting via an injector. The injector may inject a combination of fuel and air into the emission control system or only liquid fuel or only air. The fuel may be drawn from the fuel tank or the carbon evaporative canister via a pump and air may be drawn via a mixing valve (e.g., mixing valve 242 of FIG. 2). In one example, the injector may be configured to inject lean or at stoichiometric. By doing this, excess injected fuel may be avoided, which may reduce emissions.

The method 400 may proceed to 413, which includes flowing air into the fuel tank. The fuel tank may receive a compensation of air to replace lost vapors during the injections. The air flowing to the fuel tank may be proportional to the amount of vapor lost in the tank, and it may be drawn in from the carbon evaporative canister or a valve directly arranged on the fuel tank.

The method 400 may proceed to 414, which includes adjusting the electric heater and injector air/fuel ratio based on the temperature of the aftertreatment device. The second aftertreatment device may include a temperature or an oxygen sensor configured to provide feedback to a controller. A temperature of the aftertreatment device may be directly determined via the temperature feedback or estimated based on the oxygen feedback. Based on the aftertreatment device temperature, the controller may issue commands to alter the operations of the electric heater, which may include increasing or decreasing the heat output, as well as issuing commands to the air/fuel injector, which may include adjusting the ratio of injected air/fuel to be leaner or richer.

The method 400 may proceed to 416, which includes determining if the aftertreatment device is greater than a threshold aftertreatment device temperature. The temperature may be measured by a sensor located within the aftertreatment device. In one example, the threshold temperature is a light-off temperature. In another example, the threshold temperature is based on a temperature of the aftertreatment device where it reaches the light-off temperature within a threshold time period upon a subsequent engine start. The threshold time period may be a minute or less.

If the aftertreatment device temperature is greater than a threshold aftertreatment device temperature, the method 400 may proceed to 418, which includes decreasing the fuel in the injection. In one example, the injector may completely cease injecting an air/fuel mixture.

The method 400 may proceed to 420, which includes decreasing the electric heater setting. The method may continue to monitor an aftertreatment device temperature.

If the aftertreatment device temperature is not greater than a threshold aftertreatment device temperature (e.g., less than or equal to the threshold temperature), then the method 400 may proceed to 452 of FIG. 4B, which includes determining if the aftertreatment device temperature is less than a threshold aftertreatment device temperature.

If the aftertreatment device temperature is less than a threshold aftertreatment device temperature, the method 400 may proceed to 454, which includes increasing the fuel in the air/fuel injection. The controller may signal to an actuator of the injector inject more fuel or of the mixing valve to draw more fuel or draw less air.

The method 400 may proceed to 456, which includes increasing the electric heater setting. The electric heater setting may be increased which may result in a greater heat output thereof.

If the aftertreatment device temperature is not less than a threshold aftertreatment device temperature, the method 400 may proceed to 458, which includes maintaining current operating parameters. As such, the aftertreatment device temperature is substantially equal to the threshold temperature, and parameters for maintaining a temperature of the aftertreatment may be maintained. Returning to 404, if the engine temperature is greater than a threshold temperature, then the method 400 may proceed to 422, which includes closing the downstream valve.

The method 400 may proceed to 424, which includes maintaining the open position of the upstream valve. In one example, the open position is a fully open position.

The method 400 may proceed to 426, which includes closing a throttle and/or an intake valve. By doing this, the engine may be sealed from atmosphere, which may preserve a temperature thereof.

The method 400 may proceed to 428, which includes activating the fan, similar to 410 described above.

The method 400 may proceed to 430, which includes adjusting the electric heater and injector air/fuel ratio based on the engine temperature decay and the temperature of the aftertreatment device, as described above.

The method 400 may proceed to 432, which includes determining if the engine temperature is still greater than a threshold engine temperature.

If the engine temperature is still greater than a threshold engine temperature, the method 400 may proceed to 434, which includes maintaining the open state of the upstream valve, maintaining the closed state of the downstream valve, and continuing the monitoring of the engine temperature. The method 400 may continue to monitor a temperature of the engine. Once the engine is below the threshold temperature, the engine may no longer passively heat the aftertreatment device. The upstream valve may then be closed to seal the engine form the aftertreatment device to preserve a temperature of the aftertreatment device.

If the engine temperature is not greater than a threshold engine temperature, the method 400 may proceed to 406 as described above.

In some examples, the method 400 may be adjusted to adjust a timing at which the heating of the aftertreatment device is initiated. For example, the timing may be adjusted to initiate heating of the aftertreatment device within a threshold time of an estimated engine on event. The threshold time may be dynamic value based on a time needed to heat the aftertreatment device to a light-off temperature. The time needed may be based on one or more of a current aftertreatment device temperature and an ambient temperature.

Thus, the method 400 may be executed during an entire engine off event or only during a portion thereof. In some examples, selecting between executing the method 400 during the entire engine off event or during only the portion near an expected engine on event may be based on one or more of the time needed to heat the aftertreatment device, an estimated engine off duration, a fuel vapor load, a fuel volume in a fuel tank, a user preference, and the like. As one example, if the estimated engine off duration is greater than a threshold engine off duration (e.g., greater than 8 hours, or greater than 12 hours, or greater than a day) then the method 400 may be executed for only a portion of the engine off event based on when an expected engine on event will occur. The engine on event may be predicted based on a vehicle operator approaching the vehicle, a learned engine on timing, a vehicle operator indicating a request to turn the engine on at a desired time, and the like. For example, if the vehicle operator is within 1500 meters of the vehicle, as indicated via a key fob, a mobile device, or the like, then it may be predicted the engine will be turned on soon. As such, the aftertreatment device may begin to be heated via the method 400.

Turning now to FIG. 5, it shows a method 500 for determining if entry conditions for the methods of FIGS. 3 and 4 are met. The entry conditions may include conditions where maintaining a temperature of the aftertreatment device may be inefficient or may difficult due to insufficient vehicle resources.

The method 500 begins at 502, which includes determining if the engine is off. If the engine is not off, then the method 500 may proceed to 306 of FIG. 3 as described above. If the engine is off, then the method 500 may proceed to 504, which includes monitoring one or more entry conditions. The one or more entry conditions may include an engine off duration at 506, a fuel volume in the fuel tank at 508, and a battery state-of-charge (SOC) at 510.

In one example, the engine off duration may include an estimate of an expected duration of the current engine off. The estimate may be based on one or more of a time of day, a day of the week, a vehicle location, a vehicle operator, and the like. The estimate may be further based on learned driving patterns of different vehicle operators of the vehicle based on data gather during previous driving events. For example, if a vehicle operator of the vehicle routinely drives to a first location from Monday to Friday at a first time and restarts the vehicle at the first location at a second time to then drive to a second location, then this behavior may be learned. In this way, an estimated engine off duration at the first location at the first time on a Wednesday may be estimated with a threshold confidence. Additionally or alternatively, routes taken outside of learned behaviors may include where an estimated engine off duration is based on an average engine off duration at the given location based on feedback from vehicle operators of other vehicles. For example, a driving event to a new location, such as a new restaurant, may include where data from other vehicles is relayed to the vehicle to provide an average estimate of the engine off duration. If the engine off duration is estimated to be greater than a threshold engine off duration, then it may be undesired to maintain a temperature of the aftertreatment device to the threshold temperature. In one example, the threshold engine off duration may be 24 hours, or 12 hours, or 8 hours.

The fuel volume in the fuel tank may be sensed via a fuel level sensor or other similar sensor. The fuel volume may be compared to a threshold fuel volume sufficient to produce a desired amount of fuel vapors for maintaining the aftertreatment device temperature during the engine off. In one example, the threshold fuel volume may be based on one or more of a starting aftertreatment device temperature and the estimated engine off duration. For example, as the starting aftertreatment device temperature increases, the threshold fuel volume may decrease. As another example, as the estimated engine off duration increases, the threshold fuel volume may increase. If the fuel volume is less than the threshold fuel volume, then there may not be sufficient fuel in the fuel tank to heat the aftertreatment device during an entirety of the engine off. In such an example, it may be desired to avoid the routine or to modify the routine wherein a lower aftertreatment device temperature is maintained or where a magnitude of the electric heater is increased.

A battery SOC may correspond to an SOC of battery 161 of FIG. 1. The battery SOC may be compared to a threshold SOC, wherein the threshold SOC is based on a SOC needed to operate the electric heater during the engine off. As such, the threshold SOC may be based on one or more of the estimated engine off duration and the starting aftertreatment device temperature. If the battery SOC is less than the threshold SOC, then the method 400 may be avoided or the amount of fuel consumed during the method may be increased or a lower aftertreatment device temperature may be maintained, wherein the lower temperature is less than the threshold aftertreatment device temperature.

The method 500 may proceed to 512, which includes determining if the entry conditions are met. If the entry conditions are not met, then the method 500 may proceed to 306 of FIG. 3. If the entry conditions are met, then the method 500 may proceed to 406 of FIG. 4A.

Turning now to FIG. 6, it shows a plot 600 graphically illustrating adjustments to one or more components of the emission control system in response to an aftertreatment device temperature being less than the threshold temperature. Plot 610 illustrates if an engine is off. Plot 620 illustrates a first aftertreatment device temperature and dashed line 622 illustrates a light-off temperature and dashed line 624 illustrates a lower threshold first device temperature. Plot 630 illustrates if an electric heater activity. Plot 640 illustrates an amount of fuel injected. Plot 650 illustrates a present fuel vapor load, plot 652 illustrates a fuel vapor load without introducing air to a fuel tank, and dashed line 654 illustrates a threshold fuel vapor load. Plot 660 illustrates a recirculation fan status. Plot 670 illustrates a position of the upstream valve and the downstream valve. Plot 680 illustrates a second aftertreatment device temperature, dashed line 682 illustrates a light-off temperature, and dashed line 684 illustrates a lower threshold second device temperature. Time is labeled on the abscissa and increases from a left to a right side of the figure.

Prior to t1, the engine is not off (plot 610). Each of the first and second aftertreatment device temperatures are greater than respective light off temperatures (plot 620 and dashed line 622 and plot 680 and dashed line 682, respectively). As such, the electric heater is off (plot 630), the fuel is not being injected, thereby indicating the injector is inactive (plot 640), fuel vapors are not being consumed (plot 650), the recirculation fan is off (plot 660) and the valves are in open positions (plot 670).

At t1, the engine is turned off. Between t1 and t2, the first and second aftertreatment device temperatures decrease due to the engine being off, the electric heater being off, and fuel not being injected. In one example, the upstream and downstream valves are moved to fully closed positions to block ambient from flowing to the first and second aftertreatment devices, thereby reducing a rate of temperature decay. That is to say, the first and second aftertreatment devices may be insulated via the closed valves and the insulating material during the engine off.

At t2, it is determined that an engine on event may be within a threshold duration. As such, the electric heater is activated to heat the first aftertreatment device. Between t2 and t3, the electric heater remains activated at a relatively high setting to heat the first aftertreatment device to the lower threshold first device temperature (dashed line 624). The lower threshold first device temperature may correspond to a temperature high enough to burn fuel in response to a fuel injection, in one example. While some heat may pass from the electric heater to the second aftertreatment device between t2 and t3, heating during this time is insufficient to raise a temperature of the aftertreatment device to the lower threshold second device temperature (dashed line 684).

At t3, the first aftertreatment device temperature reaches the lower threshold first device temperature and in response, the injector is activated and fuel is injected at a relatively low amount to heat the first and second aftertreatment device. In one example, the amount of fuel injected is relatively low, resulting in a reduction in fuel vapors, due to the second aftertreatment device temperature still being below the lower threshold second device temperature. In one example, the lower threshold second device temperature correspond to a temperature at which the second aftertreatment device may treat (e.g., oxidize) hydrocarbons. To promote mixing of the fuel injection along with air flow from the first aftertreatment device to the second aftertreatment device, the fan is activated. Between t3 and t4, the temperature of the second aftertreatment device increases toward the lower threshold second device temperature.

At t4, the second aftertreatment device temperature is greater than the lower threshold second device temperature. As such, the amount of fuel injected may be increased now that the second aftertreatment device is configured to efficiently treat hydrocarbons. Between t4 and t5, the temperature of the first and second aftertreatment device increase toward respective light-off temperature. In the example of FIG. 6, the magnitude of the electric heater is reduced to a low setting in response to the amount of fuel injected being increased to a relatively high amount. The electric heater setting may be reduced to mitigate overheating of the first aftertreatment device while also reducing energy consumption. At t5, the engine is turned on and each of the electric heater and fan is deactivated. The fuel injection amount is reduced to zero, thereby indicating a deactivation of the fuel injector. After t5, the engine is running and cold-start emissions are reduced due to the first and second aftertreatment devices being lit-off and positioned to treat emissions from the engine.

In this way, an emission control system includes an injector and an electric heater for heating an aftertreatment device during vehicle off conditions. The emission control system may further include valves for sealing the system from an ambient atmosphere. An insulating material may be used to reduce thermal communication between the emission control system and the ambient atmosphere. A fan may be configured to promote gas flow through the emission control system in response to the valves closing.

The technical effect of the emission control system is to efficiently maintain or increase an aftertreatment device temperature during the vehicle off to reduce emissions during a subsequent vehicle start. The components of the emission control system may be used individually or in combination based on a temperature of the aftertreatment device to adjust a temperature thereof. By doing this, emissions may be reduced during a subsequent vehicle start.

An embodiment of a method, comprises heating an aftertreatment device during an engine off to maintain a temperature above a threshold temperature. A first example of the method further includes where heating comprises an injector injecting fuel or a mixture of air and fuel and an electric heater being active. A second example of the method, optionally including the first example, further includes where the fuel is liquid fuel or fuel vapor. A third example of the method, optionally including one or more of the previous examples, further includes adjusting an upstream valve to a fully closed position and a downstream valve to a fully closed position, wherein the upstream valve is arranged upstream of the aftertreatment device and a recirculation passage outlet relative to a direction of gas flow, and wherein the downstream valve is arranged downstream of the aftertreatment device and the recirculation passage inlet relative to the direction of gas flow. A fourth example of the method, optionally including one or more of the previous examples, further includes activating a recirculation fan arranged in a recirculation passage.

An embodiment of a system comprises an emission control system comprising an aftertreatment device, an injector, a recirculation fan, an upstream valve, and a downstream valve, wherein the emission control system is surrounded by an insulating material, and a controller comprising computer-readable instructions stored on non-transitory memory thereof that when executed enable the controller to in response to an engine being off, activate the injector and the recirculation fan, adjust the upstream valve and the downstream valve to a fully closed position. A first example of the system further includes where the upstream valve is arranged in a portion of an exhaust passage between the engine and an outlet of a recirculation passage. A second example of the system, optionally including the first example, further includes where the downstream valve is arranged in a portion of the exhaust passage between a tailpipe and an inlet of the recirculation passage. A third example of the system, optionally including one or more of the previous examples, further includes where the recirculation fan is arranged in the recirculation passage, wherein the recirculation passage is arranged outside of and spaced away from the exhaust passage. A fourth example of the system, optionally including one or more of the previous examples, further includes where the aftertreatment device comprises a first aftertreatment device and a second aftertreatment device arranged within a common housing. A fifth example of the system, optionally including one or more of the previous examples, further includes where the first aftertreatment device is upstream of the second aftertreatment device relative to a direction of gas flow. A sixth example of the system, optionally including one or more of the previous examples, further includes where the first aftertreatment device is smaller than the second aftertreatment device. A seventh example of the system, optionally including one or more of the previous examples, further includes where an electric heater is arranged upstream of or integrally within the first aftertreatment device. An eighth example of the system, optionally including one or more of the previous examples, further includes where the insulating material includes a double-wall with a gas arranged therebetween. A ninth example of the system, optionally including one or more of the previous examples, further includes where the emission control system is fluidly and thermally sealed from an ambient atmosphere when the upstream valve and the downstream valve are moved to the fully closed position, wherein the instructions further enable the controller to deactivate the injector and the recirculation fan, and adjust the upstream valve and the downstream valve to a fully open position in response to the engine being on.

An embodiment of a method, comprises in response to an engine off, activating an injector positioned to inject directly into an insulated section of an exhaust passage, activating a recirculation fan positioned in a recirculation passage branching from the insulated section of the exhaust passage, activating an electric heater integrally arranged within a portion of an aftertreatment device, wherein the aftertreatment device is arranged in the insulated portion of the exhaust passage, adjusting an upstream valve and a downstream valve to a fully closed position, wherein the upstream valve and the downstream valve are arranged at upstream and downstream ends of the insulated portion of the exhaust passage relative to a direction of gas flow. A first example of the method further includes adjusting an air/fuel ratio of the injector in response to a temperature of the aftertreatment device being greater than or equal to a threshold temperature. A second example of the method, optionally including the first example, further includes adjusting a setting of the electric heater in response to a temperature of the aftertreatment device being greater than or equal to a threshold temperature. A third example of the method, further including one or more of the previous examples, further includes deactivating each of the injector, the recirculation fan, and the electric heater and adjusting the upstream valve and the downstream valve to a fully open position in response to the engine being turned on. A fourth example of the method, further including one or more of the previous examples, further includes the injector injects fuel vapor, and wherein air is introduced to a fuel tank in response to a fuel vapor load decreasing below a threshold load.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer-readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   heating an aftertreatment device during an engine off to maintain a temperature above a threshold temperature; and
   activating a recirculation fan arranged in a recirculation passage with a recirculation inlet upstream of the aftertreatment device and a recirculation outlet downstream of the aftertreatment device.

2. The method of claim 1, wherein heating comprises an injector injecting fuel or a mixture of air and fuel and an electric heater being active.

3. The method of claim 2, wherein the fuel is liquid fuel or fuel vapor.

4. The method of claim 1, further comprising adjusting an upstream valve to a fully closed position and a downstream valve to a fully closed position, wherein the upstream valve is arranged upstream of the aftertreatment device and the recirculation outlet relative to a direction of gas flow, and wherein the downstream valve is arranged downstream of the aftertreatment device and the recirculation inlet relative to the direction of gas flow.

5. A system, comprising:
   an emission control system comprising an aftertreatment device, an injector, a recirculation fan, an upstream valve, and a downstream valve; wherein
   the emission control system is surrounded by an insulating material; and
   a controller comprising computer-readable instructions stored on non-transitory memory thereof that when executed enable the controller to:
   in response to an engine being off,
   activate the injector and the recirculation fan;
   adjust the upstream valve and the downstream valve to a fully closed position.

6. The system of claim 5, wherein the upstream valve is arranged in a portion of an exhaust passage between the engine and an outlet of a recirculation passage.

7. The system of claim 6, wherein the downstream valve is arranged in a portion of the exhaust passage between a tailpipe and an inlet of the recirculation passage.

8. The system of claim 6, wherein the recirculation fan is arranged in the recirculation passage, wherein the recirculation passage is arranged outside of and spaced away from the exhaust passage.

9. The system of claim 5, wherein the aftertreatment device comprises a first aftertreatment device and a second aftertreatment device arranged within a common housing.

10. The system of claim 9, wherein the first aftertreatment device is upstream of the second aftertreatment device relative to a direction of gas flow.

11. The system of claim 9, wherein the first aftertreatment device is smaller than the second aftertreatment device.

12. The system of claim 9, wherein an electric heater is arranged upstream of or integrally within the first aftertreatment device.

13. The system of claim 5, wherein the insulating material includes a double-wall with a gas arranged therebetween.

14. The system of claim 5, wherein the emission control system is fluidly and thermally sealed from an ambient atmosphere when the upstream valve and the downstream valve are moved to the fully closed position, wherein the instructions further enable the controller to deactivate the injector and the recirculation fan, and adjust the upstream valve and the downstream valve to a fully open position in response to the engine being on.

15. A method, comprising:
   in response to an engine off:
   activating an injector positioned to inject directly into an insulated section of an exhaust passage;
   activating a recirculation fan positioned in a recirculation passage branching from the insulated section of the exhaust passage;
   activating an electric heater integrally arranged within a portion of an aftertreatment device, wherein the aftertreatment device is arranged in the insulated portion of the exhaust passage;
   adjusting an upstream valve and a downstream valve to a fully closed position, wherein the upstream valve and the downstream valve are arranged at upstream and downstream ends of the insulated portion of the exhaust passage relative to a direction of gas flow.

16. The method of claim 15, further comprising adjusting an air/fuel ratio of the injector in response to a temperature of the aftertreatment device being greater than or equal to a threshold temperature.

17. The method of claim 15, further comprising adjusting a setting of the electric heater in response to a temperature of the aftertreatment device being greater than or equal to a threshold temperature.

18. The method of claim 15, further comprising deactivating each of the injector, the recirculation fan, and the electric heater and adjusting the upstream valve and the downstream valve to a fully open position in response to the engine being turned on.

19. The method of claim 15, wherein the injector injects fuel vapor, and wherein air is introduced to a fuel tank in response to a fuel vapor load decreasing below a threshold load.

* * * * *